Patented Jan. 8, 1924.

1,479,848

UNITED STATES PATENT OFFICE.

HORACE M. WILLIAMS, OF PROVIDENCE, RHODE ISLAND, ASSIGNOR TO ELECTROL MANUFACTURING COMPANY, A CORPORATION OF RHODE ISLAND.

STORAGE BATTERY.

No Drawing. Application filed October 15, 1919, Serial No. 330,893. Renewed May 5, 1923.

*To all whom it may concern:*

Be it known that I, HORACE M. WILLIAMS, a citizen of the United States of America, residing at Providence, county of Providence, State of Rhode Island, have invented certain new and useful Improvements in Storage Batteries, of which the following is a specification.

My invention relates to electric batteries and comprises a solid electrolyte for secondary or storage batteries, the battery formed therewith and process of making same. This electrolyte is as efficient as the best liquid electrolyte now known and more advantageous in many ways and much more convenient to handle. My invention applies to the standard form of secondary or storage battery as now commonly employed using lead plates and sulphuric acid, and in substance involves the mixture with such sulphuric acid of a material which co-operates with it to produce a solid paste-like body which apparently does not evaporate, or at least evaporates very slowly, but which serves as a solid vehicle for retaining a residual volume of acid in operative relation with the lead plates. Whatever the true analysis of the operation the result is the full battery output of current, and also the exercising by this solid electrolyte of the function of the usual separators in holding the battery plates properly separated each from the other and in normal operative position.

According to my present information the material to be added as above should be commerical silicate of soda, sometimes called water glass, mixed with methyl salicylate which is commonly known as synthetic oil of wintergreen. Still further improved results are secured if a small proportion of a coal tar product such as the material known commercially as West's disinfectant is added to the silicate of soda.

According to my best present information the preferred method of carrying out my invention is the following:

I first mix about one gallon of liquid silicate of soda with about one fluid ounce of each of the two materials mentioned above. This I dilute with about three gallons of water and add five gallons of a sulphuric acid solution of 1400 specific gravity. The more concentrated sulphuric acid of commerical form having a density of 1850 specific gravity may be used, if more of the original solution is employed, but it produces much heat on mixing with the silicate of soda solution. This heating action is inconvenient and might destroy the vessel containing the mixture and I prefer to use the more dilute form of the acid as specificed. The mixture soon begins to set or change into a flocculent precipitate, and in from one to two hours the transformation from liquid to solid is complete so far as the eye can see, and the result is a damp jelly-like mass.

The mixture of the silicate of soda solution and the acid is made in any suitable vessel in which a homogeneous mixture can be easily produced and is then poured into the battery cells, the usual separators preferably having first been removed from between the plates, as my solid electrolyte exerts a more perfect spacing and separating action than any wooden or other separator plates. Just so much dead space and material can thus be eliminated from the battery cell and active electrolytic material substituted therefor. Such separators may be left in position if desired. The mixture may, if desired, be made in the battery jar itself.

When the mixture of the above proportions solidifies it is transformed into a damp paste-like mass which is mainly colloidal silica, formed by the reaction between the silicate of soda and a portion of the sulphuric acid. This is a highly porous mineral body and in its pores the residual acid, the coal tar product and the methyl salicylate are held in suspension. If the proportion of silicate of soda is increased in quantity the resultant product is harder and tougher and if the increase of the silicate of soda component is carried far enough the product ultimately becomes too hard to afford freedom of circulation for the suspended fluids and gases evolved by the electrolytic action when the battery is discharged.

The function of the methyl salicylate seems to be to reduce the internal resistance of the battery and that of the coal tar product is to prevent sulphation of the plates.

The liquid mixture originally placed or formed in the battery cell as above described evidently permeates the porous lead plates and, when the transformation to solid form has been accomplished, more intimate contact is established and maintained between the plates and the electrolyte.

The advantages of my invention are obvious. The creeping and fuming destructive action of the liquid sulphuric acid electrolyte is entirely eliminated. As the small amount of liquid present is held in suspension in a mineral sponge-like body, the battery can be tipped over to any angle without affecting its action. As there is no possibility of the plates buckling the battery will stand overcharging without serious results. In fact old batteries with cracked plates work like new ones when my invention is applied to them. No sulphating of the plates occurs when the battery stands idle. The sulphated plates of old batteries are cleaned by the mixture and there are no separating plates or similar devices to deteriorate with age.

As the material shakes down with use or otherwise slowly decreases in volume from any cause, the voids may be filled by pouring in a little more of the original solution, or by adding a small amount of water.

My invention practically makes a good storage battery cell indestructible by ordinary use, as the removal of any large, free body of liquid electrolyte eliminates the washing from the lead plates of the fine deposits of oxide produced in normal battery action, which deposits constitute the most essential, delicate and easily destructible feature of the standard lead battery and are frequently broken up by the ebb and flow of a liquid electrolyte and other disturbing influences, and accumulate in the bottom of the cell as so much sediment. In contradistinction to this destructive action of the usual liquid electrolyte on the fine branchiform masses of active material which exist when the battery is at its highest efficiency, my solid electrolyte forms a matrix and support for these delicate structures, preventing their falling from the lead plates from the action of gravity, or any other cause, and thus maintaining the plates in their most efficient condition.

An important feature of my invention is the non-fusibility of the body of colloidal silica, holding the electrolyte. Even when subjected to high heat this material merely dries out without melting or fusing. Consequently no amount of heat applied either externally or internally to a battery equipped with my electrolyte, below that which would fuse the lead plates, has any serious deleterious effect other than to dry out the water which can be readily replaced.

Batteries constructed according to my invention can be subjected to freezing temperature without injury as there is little or no freezing expansion of the small amount of water in the residual acid held in a finely divided state in the colloidal silica sponge like body, and the plates are not broken thereby. Comparative tests made with standard cells equipped with my invention have shown an internal resistance of only ten hundredths of an ohm, as against eighteen hundredths of an ohm for the same cell filled with liquid electrolyte of standard specific gravity.

I find the best results are obtained if the cells are filled with the above described mixture when the plates are in discharged condition. The proportions of acid, water and silicate of soda should then be such that after the alkaline portion of the mixture has combined with its corresponding amount of acid, the residual acid solution left in the pores of the coloidal silica mass will have a specific gravity about equal to that of the standard sulphuric acid electrolyte. The above stated proportions will secure this result approximately and have given excellent results in extensive practical use, but I am pursuing further investigations in the effort to determine more exactly the proportions necessary to produce the residual electrolytes best adapted for different kinds of batteries, and for batteries of the same kind required for different kinds of duty.

Having described my invention I claim:

1. An electric storage battery having, in combination with the usual lead plates, a body of colloidal silica precipitated in situ serving as a matrix and an electrolyte in suspension in said body comprising a sulphuric acid solution mixed with a minor quantity of methyl salicylate.

2. An electric storage battery having, in combination with the usual lead plates, a body of colloidal silica, precipitated in situ serving as a matrix for the electrolyte, and an electrolyte in suspension in said body comprising a sulphuric acid solution mixed with a minor quantity of a liquid coal tar product.

3. An electric storage battery having, in combination with the usual lead plates, a body of colloidal silica precipitated in situ serving as a matrix for the electrolyte, and an electrolyte in suspension in said body comprising a sulphuric acid solution mixed with a minor quantity of methyl salicylate and a liquid coal tar product.

4. An electrolyte for storage batteries having lead plates which comprises a sulphuric acid solution mixed with minor quantities of methyl salicylate and a liquid coal tar product.

HORACE M. WILLIAMS.